United States Patent
Abboud et al.

(10) Patent No.: US 11,927,501 B2
(45) Date of Patent: Mar. 12, 2024

(54) METHOD AND DEVICE FOR MONITORING A GEAR SYSTEM

(71) Applicant: SAFRAN, Paris (FR)

(72) Inventors: Dany Abboud, Moissy-Cramayel (FR); Mohamed El Badaoui, Moissy-Cramayel (FR); Yosra Marnissi, Moissy-Cramayel (FR)

(73) Assignee: SAFRAN, Paris (FR)

( * ) Notice: Subject to any disclaimer, the term of this patent is extended or adjusted under 35 U.S.C. 154(b) by 120 days.

(21) Appl. No.: 17/050,275

(22) PCT Filed: Apr. 19, 2019

(86) PCT No.: PCT/FR2019/050945
§ 371 (c)(1),
(2) Date: Oct. 23, 2020

(87) PCT Pub. No.: WO2019/207242
PCT Pub. Date: Oct. 31, 2019

(65) Prior Publication Data
US 2021/0239570 A1    Aug. 5, 2021

(30) Foreign Application Priority Data
Apr. 24, 2018  (FR) ..................... 1853561

(51) Int. Cl.
*F03D 7/02*       (2006.01)
*G01M 13/028*  (2019.01)
*G06F 17/14*     (2006.01)

(52) U.S. Cl.
CPC ......... *G01M 13/028* (2013.01); *G06F 17/141* (2013.01)

(58) Field of Classification Search
CPC ........................ G01M 13/028; G06F 17/141
See application file for complete search history.

(56) References Cited

U.S. PATENT DOCUMENTS

2014/0039809 A1* 2/2014 Girondin ............ G01N 29/4463
702/39

FOREIGN PATENT DOCUMENTS

EP        2963408 A1    1/2016
WO   WO 03/006935 A1  1/2003

OTHER PUBLICATIONS

Chen Lu, Yang Wang, Minvydas Ragulskis, Yujie Cheng, "Fault Diagnosis for Rotating Machinery: A Method based on Image Processing" 2016; PLOS One, pp. 1-22. (Year: 2016).*

(Continued)

*Primary Examiner* — Mohamed Charioui
*Assistant Examiner* — Christine Y Liao
(74) *Attorney, Agent, or Firm* — Birch, Stewart, Kolasch & Birch, LLP

(57) ABSTRACT

The invention concerns a method for monitoring a gear system (1) comprising at least two wheels, each wheel having a characteristic frequency ($f_1$, $f_2$), a vibratory or acoustic signal representative of these vibrations having been acquired by a sensor (21), a vibratory or acoustic digital signal x(t) having been obtained, the method comprising, for each characteristic frequency of the system (1), the steps of filtering (E1) the digital signal by means of a filter in such a way as to obtain an image monitoring signal of at least one vibratory component of at least one defect; determining (E3) the square envelope of said monitoring signal, defined by the square absolute value of the Hilbert transform of the monitoring signal so as to extract an image of the modulating signals associated with the rotation of the wheels from the monitoring signal; determining (E4) the synchronous average of said square envelope relative to the period of rotation of a wheel of interest chosen from the wheels of the gear, said average helping attenuate spurious components in the envelope originating from other mechani- (Continued)

cal sources; determining (E5) a monitoring indicator dependent on said synchronous average, said monitoring indicator being defined by the square root of the synchronous average normalised by the median value of the synchronous average.

11 Claims, 3 Drawing Sheets

(56) References Cited

OTHER PUBLICATIONS

A. Djebala, N. Ouelaa, C. Benchaabane, D.F. Laefer, "Application of the Wavelet Multi-resolution Analysis and Hilbert transform for the prediction of gear tooth defects" 2010; Meccanica, pp. 1601-1612. (Year: 2010).*

B. Hizarci, R.C. Ümütlü, & H. Ozturk, & Z. Kiral, "Vibration Region Analysis for Condition Monitoring of Gearboxes Using Image Processing and Neural Networks" 2018; Experimental Techniques, pp. 739-755. (Year: 2018).*

D.P. Jena, S.N. Panigrahi, "Automatic gear and bearing fault localization using vibration and acoustic signals" 2015; Applied Acoustics, pp. 20-33. (Year: 2015).*

Zeki Kiral, Hira Karagulle, "Simulation and analysis of vibration signals generated by rolling element bearing with defects" 2002; Tribology International, pp. 667-678. (Year: 2002).*

F.Combet, L.Gelman, "Optimal filtering of gear signals for early damaged detection based on the spectral kurtosis" 2008; Mechanical Systems and Signal Processing, pp. 652-668. (Year: 2008).*

W.J. Wang, P.D. McFadden, "Early detection of gear failure by vibration analysis—ii. Interpretation of the time-frequency distribution using image processing techniques" 1993; Mechanical System and Signal Processing; Abstract. (Year: 1993).*

Randall, "Machine Diagnostics using Advanced Signal Processing", URL https://www.phmsociety.org/sites/phmsociety.org/files/Tutorial9%20Diagnostics%20Randall.pdf, Sep. 26, 2011, pp. 45-50 (84 pages).

* cited by examiner

METHOD AND DEVICE FOR MONITORING A GEAR SYSTEM

GENERAL TECHNICAL FIELD

The invention relates to the field of detection of the mechanical faults in gears by analysis of the vibratory signals generated thereby and advantageously finds application in the detection of such faults in aircraft or helicopter engines for the monitoring of such systems.

STATE OF THE ART

A gear is a mechanical system made up of at least two meshed toothed wheels used to transmit the rotational movement therebetween.

The vibrations emitted by such a gear carry useful information on its state of health. Therefore, their analysis is an effective, non-intrusive and low-cost monitoring means.

Indeed, from a "signal" point of view, the measured vibrations of a single gear operating in (quasi)-steady state can be modeled as a product of multiplication of a meshing signal $s_e(t)$ with two modulating signals $s_1(t)$ and $s_2(t)$. It is expressed as follows:

$$s(t)=s_e(t)(1+s_1(t)+s_2(t))$$

with:
$s_e(t)$: The meshing signal being periodic with respect to the meshing period $T_e=1/f_e$
$s_1(t)$: The modulating signal of the wheel 1 being periodic with respect to the rotation period $T_1=1/f_1$
$s_2(t)$: The modulating signal of the wheel 2 being periodic with respect to the rotation period $T_2=1/f_2$
$Z_1$ and $Z_2$ refer to the numbers of teeth of the wheels 1 and 2, respectively. The frequencies $f_e$, $f_1$ and $f_2$ are related together according to the following equation:

$$f_e=Z_1f_1=Z_2f_2$$

The frequency $f_e$ is the meshing frequency, $f_1$ and $f_2$ are the rotational frequencies of the wheels 1 and 2 respectively.

The signal $s_e(t)$ physically represents the response of the meshing force generated upon contact between teeth, thus the meshing period refers to the duration between the engagement of a tooth and its disengagement.

The modulating signal of interest $s_I(t)$ (I=1,2), physically represents the non-regularity of the meshing caused by the wheel I.

Ideally, $s_I(t)$ is a constant for a perfect wheel (that is to say without anomaly but which may have a small irregularity). However, in practice, the presence of the non-regularity is common and does not necessarily imply the presence of a fault. Indeed, the non-regularity may be due to slight manufacturing, assembly or asymmetry errors. For this reason, the information on the state of health of the wheel I depends on the shape of the signal $s_I(t)$.

For example, if the signal $s_I(t)$ presents a periodic train with transients, this indicates the presence of a local fault (for example of the flaking type).

A known problem in the detection of the faults in the gears is that the meshing signal is energetically much stronger than the modulating signals, even in the presence of a fault on one of the wheels.

Consequently, the signature of the fault is often obscured by the meshing phenomenon.

A classical method for detecting a fault is to monitor the evolution of the modulations around the meshing frequencies in the spectrum of the signal (in dB).

However, this classical method has the disadvantage of being often inaccurate because it does not provide information on the shape of the modulating signal.

Another classical method is to demodulate (in amplitude and in frequency) in a band centered on a meshing harmonics.

This method aims at restoring an image of the envelope (or of the phase) of the modulating signal ($s_I(t)$) but presents poor performances in the case where other interferences (periodic interferences, stationary colored noise) occur, which is a typical scenario in the complex systems.

Other source separation methods can restore an image of the modulating signals in an effective way but requiring a high calculation cost.

PRESENTATION OF THE INVENTION

One aim of the invention is to propose a method for monitoring a gear system which is simple to operate and which is effective.

To this end, the invention proposes a method for monitoring a gear system comprising at least two wheels, each wheel having a characteristic frequency, a vibratory or acoustic signal representative of these vibrations having been acquired by a sensor, a vibratory or acoustic digital signal x(t) having been obtained, the method comprising, for each characteristic frequency of the system, the steps of:
  filtering, E1, by means of a filter, the digital signal so as to obtain an image monitoring signal of at least one vibratory component of at least one fault;
  determining, E3, the square envelope of said monitoring signal, defined by the squared absolute value of the Hilbert transform of the monitoring signal so as to extract an image of the modulating signals associated with the rotation of the wheels from the monitoring signal;
  determining, E4, the synchronous average of said square envelope with respect to the period of rotation of a wheel of interest chosen among the wheels of the gear, said average making it possible to attenuate spurious components in the envelope coming from other mechanical sources;
  determining, E5, a monitoring indicator as a function of said synchronous average, said monitoring indicator being defined by the square root of the synchronous average normalized by the median value of the synchronous average.

With regard to step E1, it aims at improving the shape of the modulation produced by the defective wheel by applying an optimal filter. For example, it is possible to calculate this filter from the spectral kurtosis:

$$H(f) = \sqrt{KS_x(f)}$$

with $KS_x(f)$ the spectral kurtosis defined as:

$$KS_x(f) = \frac{\langle |X(n\Delta t; f)|^4 \rangle}{\langle |X(n\Delta t; f)|^2 \rangle^2} - 2$$

where $X(n\Delta t; f)$ is the short-term Fourier transform of x(t), $\Delta t$ is the temporal resolution of the spectrogram, n the time index and $\langle * \rangle$ the average operator with respect to n. Other filters can also be applied.

With regard to step E3, as the information related to the fault is carried by the modulating signal and not by the meshing signal, the determination of the square envelope, E3, allows highlighting the modulating signal potentially of the fault and compensating for the effect of the meshes.

With regard to step E4, the calculated square envelope has the same length of the original signal and comprises asynchronous interferences upon rotation of the wheel of interest added on the signal from one cycle to another. Since the modulation of a wheel is by nature periodic, the average of the cycles (i.e. the application of the synchronous average) will preserve the modulation of the wheel of interest and reject all the asynchronous interference coming from other mechanical or electromagnetic sources.

With regard to step E5, it allows obtaining a square image (because the square envelope is used) of the modulation defined on a cycle (or a rotation or a period) of the wheel of interest of the wheel of interest. In order to obtain an image of the modulating signal (which physically represents the stiffness of the surface of the teeth of the wheel of interest), its square root is taken. The normalization by the median value allows normalizing this indicator so that it is universal.

The invention is advantageously supplemented by the following characteristics, taken alone or in any one of their technically possible combination.

The method comprises a step of displaying, in polar coordinates of the thus obtained indicator, an indicator signaling at least one fault when it varies around a unit circle.

The method comprises a step of obtaining a filter from a selective spectral kurtosis defined by the part of the spectral kurtosis of the digital signal related to said characteristic frequency.

Advantageously, the determination of the selective spectral kurtosis of the digital signal comprises the following sub-steps:

determining a short-term Fourier transform of the digital signal defined by:

$$X(i\Delta t; m\Delta f) DFT_{n\delta_r \to m\Delta f}^{Nh}\{h(n\delta_r - i\Delta t)x(n\delta_r)\} \ 0 \leq m < S$$

with $\Delta t/\delta_r = N_h(1-\rho)$ where $\rho$ refers to the rate of overlap of the sliding window and $S = T/\Delta t$ is the digital length of the short-term Fourier transform with respect to the variable $i\Delta t$ and T is the duration of acquisition of the signal;

normalizing, for each frequency $m\Delta f$, the short-term Fourier transform obtained as follows:

$$X_N(i\Delta t; m\Delta f) = \frac{X(i\Delta t; m\Delta f)}{\sigma_x(m\Delta f)},$$

where $$\sigma_x(m\Delta f) = \sqrt{\frac{1}{S}\sum_{n=0}^{S-1}|X(i\Delta t; m\Delta f)|^2}$$

is the standard deviation of the short-term Fourier transform with respect to the time variable at the frequency $m\Delta f$.

determining, for each frequency $m\Delta f$, the discrete Fourier transform with respect to a time axis $$\Gamma_{2X}(a \cdot \Delta\alpha; m\Delta f) = \frac{1}{S} DFT_{i\Delta t \to a \cdot \Delta\alpha}^S \{|X_N(i\Delta t; m\Delta f)|^2\},$$

where $$\Delta\alpha = \frac{1}{\Delta t \cdot S}$$

is the frequency resolution with respect to the secondary frequency $a\Delta\alpha$.

determining the selective spectral kurtosis by means of the following functional:

$$KSS_{4X}^{f1}(m\Delta f) = \sum_{a=c \cdot k} |\Gamma_{2X}(a\Delta\alpha; m\Delta f)|^2,$$

with c=1, 2, 3 . . . and such that c<S/2k−1,

The step of obtaining the filter is defined by the square root of the selective spectral kurtosis as follows:

$$H_{f_l}(m\Delta f) = \sqrt{KSS_X^{f_l}(m\Delta f)}$$

with $f_l$ the considered characteristic frequency.

The method comprises a step of obtaining a filter from the spectral kurtosis or from the kurtogram of the digital signal.

The method comprises a step of measuring and acquiring a vibratory or acoustic digital signal x(t), the acquisition being implemented by an accelerometer or a microphone.

The method comprises a step of angularly re-sampling the vibratory or acoustic digital signal.

The invention also relates to a monitoring system comprising a processing unit configured to implement a method according to the invention, said system preferably comprising a unit for measuring and acquiring a vibratory digital signal x(t), said acquisition measuring unit comprising a sensor, preferably an accelerometer or a microphone.

The invention also relates to a computer program product comprising program code instructions for executing the steps of the method according to the invention, when this method is executed by at least one processor.

The advantages of the invention are numerous:

The indicator used is simple and intuitive. Indeed, the invention proposes a single normalized indicator which directly reflects the state of the teeth of the monitored wheel and which is consistent with the physics of the gear (unlike the other approaches that calculate point indicators of statistical or energy types). It allows not only detecting the presence of the fault but also having more information on its type, namely local or distributed type.

The method is robust to noises coming from mechanical, electrical or electromagnetic sources.

The invention is easy to implement and is fast: all the transformations used have a very reasonable calculation time and do not require a large memory space. The operations used are mainly operations of additions, multiplications and Fourier transforms which can be easily implemented by the Fast Fourier Transform (FFT) algorithm.

PRESENTATION OF THE FIGURES

Other characteristics, aims and advantages of the invention will emerge from the following description which is purely illustrative and not limiting and which should be read in relation to the appended drawings in which.

DETAILED DESCRIPTION OF THE INVENTION

Figure 1:
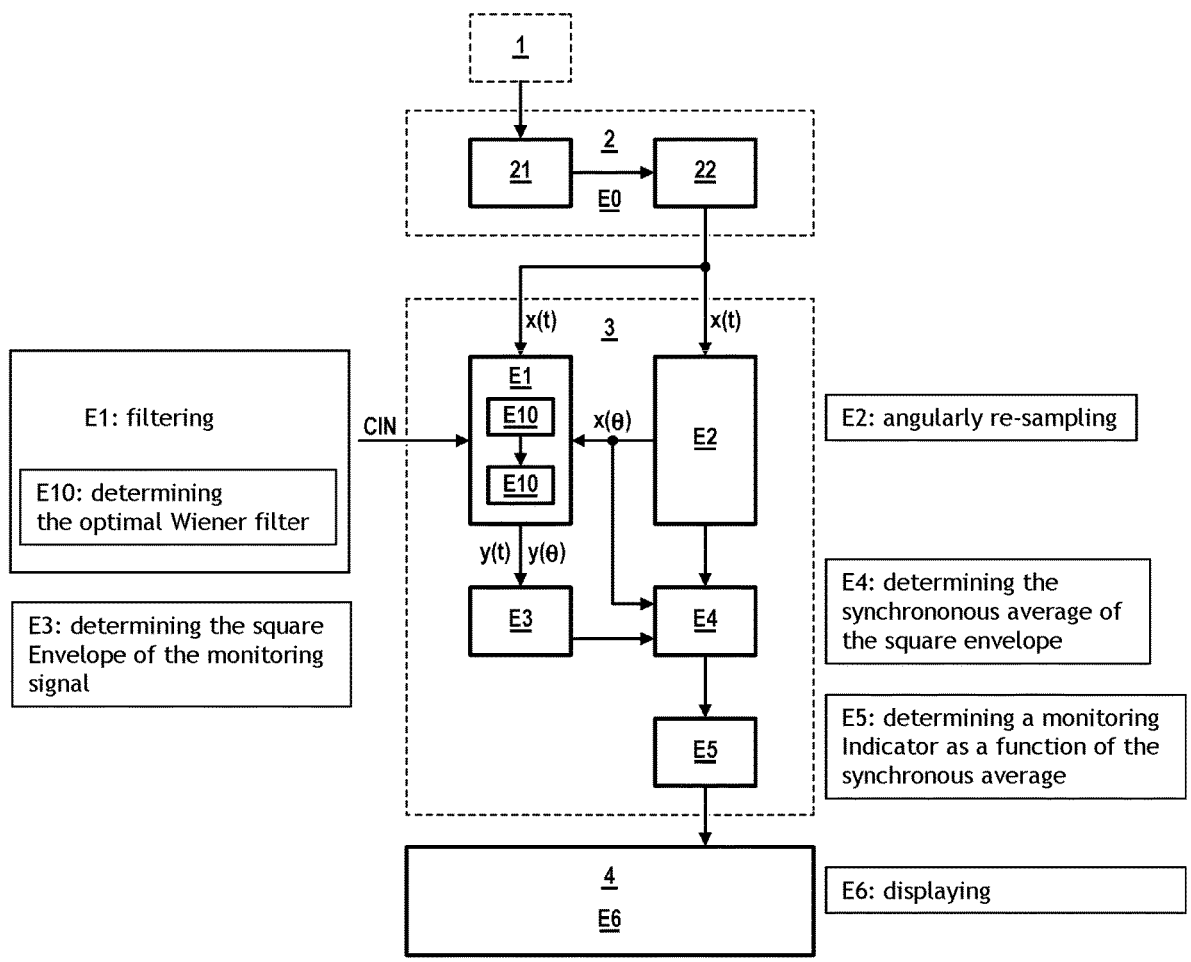
FIG. 1 illustrates steps of a monitoring method according to the invention.

FIG. 1 illustrates an exemplary implementation of a monitoring system and method according to the invention.

A system 1 comprising at least two (2) gears (or wheels) is monitored to detect any mechanical faults therefrom. Such a system is present in an aircraft engine, a helicopter engine, a motor vehicle, a wind turbine, etc.

A measurement unit 2 allows measuring and acquiring a vibratory signal generated by the gear system 1 when it is in operation.

Such an acquisition unit comprises a sensor 21 configured to measure the vibratory signal. The sensor 21 allows obtaining an analog signal representative of the vibratory signal and is connected to an acquisition chain 22 configured to provide a vibratory digital signal x(t). A sensor 21 is for example a microphone.

The acquisition chain 22 comprises, as such, a conditioner (not represented), an analog anti-aliasing filter (not represented), a sample-and-hold circuit (not represented) and an analog-to-digital converter (not represented). The elements of the acquisition chain 22 are well known to those skilled in the art and will not be detailed here.

The vibratory digital signal x(t) obtained is then fed to a processing unit 3 which is configured to implement a method for monitoring the gear system with the aim of monitoring it and detecting possible mechanical faults therefrom. Particularly, as will be detailed in the following, a monitoring signal making it possible to determine easily usable monitoring indicators is obtained.

The processing unit 3 is in particular configured to implement various steps which will be described below.

The processing unit 3 allows communicating to a display unit 4 monitoring indicators for display in order to be viewed by an operator in particular. The display unit also allows displaying various indicators generated from the monitoring signal.

The monitoring method is now described.

A vibratory digital signal $x(t)=x(n\delta_t)$ is acquired (step E0) via the measurement and acquisition unit 2. This digital signal is the digital version of the analog signal measured and acquired by the sensor 21 and the acquisition chain 22.

The digital signal x(t) has a predefined duration $T=L\cdot\delta_t$, with $\delta_t=1/F_s$ is the sampling period and L is the digital length of the signal, during which the system 1 operates in a steady state that is to say at an almost constant speed and load.

This condition of stationarity is verified if the standard deviation of the speed profile v(t) does not exceed 5% of its average value:

$$\sqrt{\frac{1}{L}\sum_{n=0}^{L-1}\left(v(n\delta_t)-\frac{1}{L}\sum_{n=0}^{L-1}v(n\delta_t)\right)^2} \le \frac{0.05}{L}\sum_{n=0}^{L-1}v(n\delta_t).$$

It is considered that the kinematics CIN of the system 1 to be monitored is known in order to be able to calculate the characteristic frequencies of the gear (frequencies $f_e$, $f_1$ and $f_2$ presented in the introduction, for example for a two-wheel system).

The digital signal will be filtered (step E1) by means of an optimal filter in order to obtain an image of the impulse signal. The signal thus filtered is a monitoring signal.

Alternatively, an angular re-sampling step (step E2) can be implemented on the acquired digital signal. Such a step has the advantage of synchronizing the cyclic content to the shaft of the motor. The angular re-sampling, however, requires the presence of a tachometer signal, acquired together with x(t), making it possible to approximate the speed and to transform the signal in the angular range (x(θ) where θ is the angular variable). Thus, in this variant, it is the signal in the angular range that is used in the following steps.

Let return to the filtering (step E1) of the digital signal. This filtering step comprises in particular obtaining an optimal filter (step E10). An optimal filter is, for example, a Wiener filter estimated by means of a selective spectral kurtosis, of the spectral kurtosis or of the kurtogram.

This step is a band-pass type filtering in which the filtered signal presents an image of the vibratory component of the fault.

By selective spectral kurtosis (noted KSS) is meant the part of the spectral kurtosis related to the characteristic frequency. The notion of selectivity is related to the fact that the KSS is, in other words, a selection of a part of the KS usually calculated. The KSS advantageously allows characterizing the transients related to a target characteristic frequency.

Figure 2:
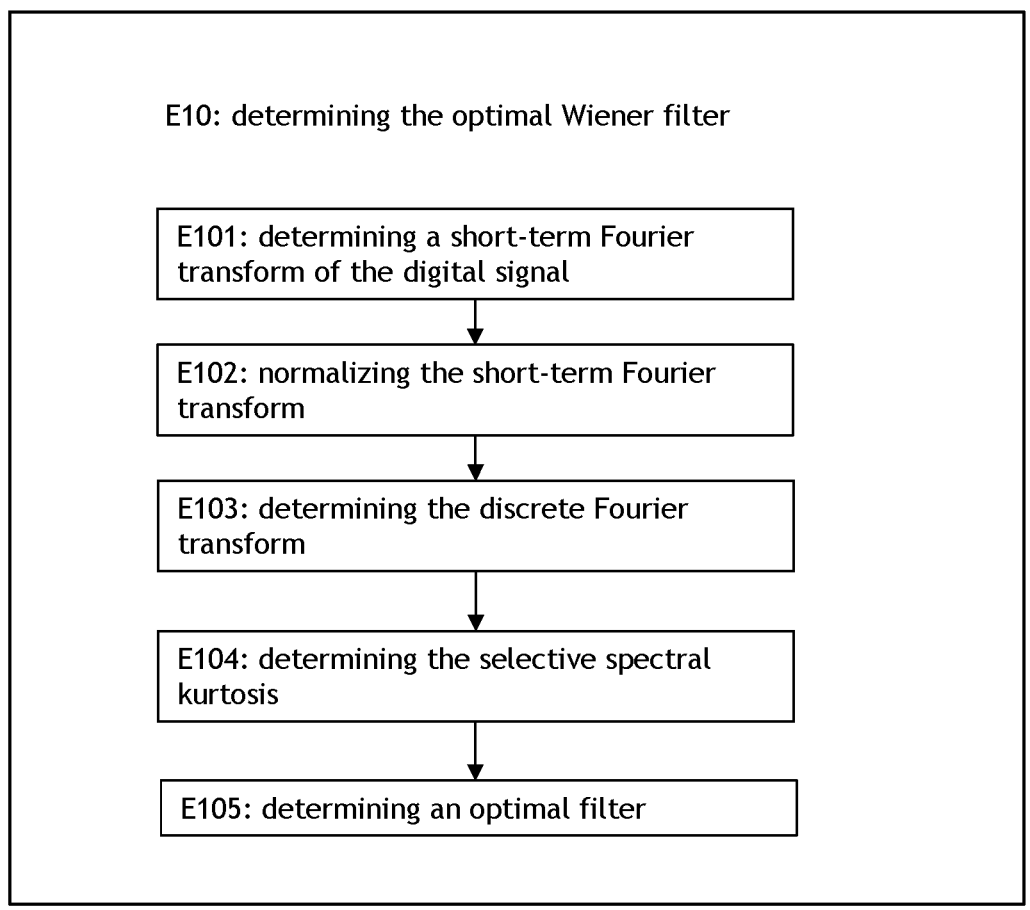
FIG. 2 illustrates sub-steps of a step of the monitoring method according to the invention.

FIG. 2 illustrates the main steps allowing the determination of the optimal Wiener filter (step E10) estimated by means of the KSS according to a preferred but non-limiting embodiment. The KSS for a characteristic frequency $f_1$ is noted mathematically $KSS_{4x}^{f_1}(f)$.

First, the short-term Fourier transform (TFCT) is applied to the digital signal (step E101).

The TFCT is calculated by applying a sliding window $\{h(n\delta_t)\}_{n=0}^{N_h-1}$ of length $N_h$ to the digital signal $x(t)=x(n\cdot\delta_t)$. The TFCT is defined as follows:

$$X(i\Delta t;m\Delta f)=DFT_{n\delta_t\to m\Delta f}^{N_h}\{h(n\delta_t-i\Delta t)x(n\delta_t)\}\ 0\le m<S$$

with $\Delta t/\delta_t=N_h(1-\rho)$ where ρ refers to the rate of overlap of the sliding window, $S=T/\Delta t$ refers to the digital length of the TFCT with respect to the variable $i\Delta t$ (T referring to the duration of acquisition of the signal). The TFCT is a matrix of dimension $N_h$ to S referring respectively to the frequency and time axis.

Then, for each frequency $m\Delta f$, the TFCT is normalized by the standard deviation (step E102), as follows:

$$X_N(i\Delta t; m\Delta f) = \frac{X(i\Delta t; m\Delta f)}{\sigma_x(m\Delta f)},$$

where, $$\sigma_x(m\Delta f) = \sqrt{\frac{1}{S}\sum_{n=0}^{S-1}|X(i\Delta t; m\Delta f)|^2}$$

is the standard deviation of the TFCT with respect to the time variable at the frequency $m\Delta f$.

The discrete Fourier transform of $X_N(i\Delta t; m\Delta f)$ is then calculated for each frequency $m\Delta f$, with respect to the time axis and is defined as follows (step E103):

$$\Gamma_{2X}(a \cdot \Delta\alpha; m\Delta f) = \frac{1}{S} DFT^S_{i\Delta t \to a\Delta\alpha}\{|X_N(i\Delta t; m\Delta f)|^2\},$$

where $$\Delta\alpha = \frac{1}{\Delta t \cdot S}$$

is the frequency resolution with respect to the secondary frequency $\alpha\Delta\alpha$. The quantity obtained is a matrix having the same dimension as the TFCT but comprising two frequency variables of unit Hertz.

Then, let k the integer such that the characteristic frequency of the wheel of interest is written in the form: $f_I = k\Delta\alpha$, the KSS is then obtained as follows (step E104):

$$KSS^{f_I}_{4X}(m\Delta f) = \sum_{a=c \cdot k} |\Gamma_{2X}(a\Delta\alpha; m\Delta f)|^2.$$

with c=1, 2, 3 . . . and such that c<S/2k−1.

In a complementary manner, if the frequency $f_I$ does not coincide with the frequency resolution $\Delta\alpha$, an interpolation (for example cubic interpolation) can be set up to carry out the sum.

Thus, a KSS for each frequency of interest of the system 1 to be monitored is obtained.

In a complementary manner, in the case where the angular re-sampling is performed, the KSS can be applied to the angular signal $x(\theta)$ in a manner perfectly similar to the one described for x(t).

Once the KSS is obtained for each frequency, an optimal filter is estimated as follows (step E105):

$$H_{f_I}(m\Delta f) = \sqrt{KSS^{f_I}_{4X}(m\Delta f)}.$$

The digital signal is then effectively filtered (step E11) by means of this filter in order to promote the impulsivity associated with the frequency of the suspicious part from the spectral point of view of the system to be monitored.

The filtered signal, noted y(t), is then given by:

$$y(n\delta t) = IDFT^M_{j\delta f \to m\delta t}\{H_{f_I}(j\delta f)X(j\delta f)\},$$

where $X(j\delta f)$ is the Fourier transform of x(t) that is to say, $$X(r\delta f) = DFT^S_{n\delta t \to r\delta f}\{x(n\delta t)\},$$

and $\delta f = F_s/L$ is the frequency resolution.

In a complementary manner, an intermediate interpolation step may be required to be able to calculate the coefficients of $H_{f_I}$ at the frequencies $j\delta f$ from those calculated at the frequencies $m\Delta f$.

In order to highlight the modulation induced by the wheel of interest, the square envelope EC of the filtered signal is calculated as follows (step E3):

$$EC(n\delta t) = |\text{Hilbert}\{y(n\delta t)\}|^2.$$

As observed, this is the square of the absolute value of the Hilbert transform of the filtered signal.

The use of the square envelope of the signal is preferred to the envelope alone because it is more effective. Indeed, the latter can induce artifacts (components that do not have a physical meaning).

This step E3 allows extracting an image of the modulating signals associated with the rotation of the wheels from the signal filtered in step E1.

Although the square envelope of the filtered signal is dominated by the modulation of the suspicious wheel, interferences coming from the other components of the mechanical chain may be present. The reason for the presence of these interferences is the fact that the filter derived from the KSS is an optimal filter which preserves the course of the signal of interest (that is to say minimizing the square error between the filtered signal and the signal of modulation of the wheel of interest).

In order to reject any asynchronous interference, the synchronous average MS is calculated (step E4) with respect to the period of rotation of a wheel of interest (chosen among one of the wheels of the gear). By designating as $N=T_I/\delta t$ the number of points per revolution of the period of interest $T_I$, the synchronous average is written as follows:

$$MS(n\delta t) = \frac{1}{G}\sum_{g=0}^{G} EC(\bar{n}\delta t + gT_I) = \frac{1}{G}\sum_{g=0}^{G} EC((\bar{n} + gN)\delta t)$$

$$0 \le n < N$$

with $\bar{n} = \lfloor n/N \rfloor$ is the remainder of the division n/N and G=L/N is an integer referring to the number of cycles performed by the wheel of interest. The synchronous average is defined over N points, being a single period of the wheel of interest.

The thus obtained synchronous average MS can be used as a monitoring indicator. In this case, it is necessary to be able to follow its evolution over time. In other words, a reference is always required to assess and quantify the evolution of the fault.

The synchronous average allows attenuating spurious components in the envelope coming from other mechanical sources. A noise-free envelope having an image of the square of the modulating signal of the wheel of interest is therefore obtained.

Also, preferably, a fault indicator is determined (step E5) from the synchronous average normalized by the median value as follows:

$$I(n\delta t) = \sqrt{MS(n\delta t)/\text{median}(MS(n\delta t))}$$

$$0 \le n < N$$

The presence of the square root allows the indicator to be homogeneous with the magnitude of the signal (it is recalled that the result obtained is the square envelope).

The median is used because it is robust to the outliers relating to the potential presence of a local fault.

In a complementary manner, this indicator is displayed (step E6) in polar coordinates:

$$P(\phi) = P(2\pi n/N) = I(n\delta t) \quad 0 \le \phi < 2\pi$$

Indeed, the circular geometry of the gear makes the polar representation much more intuitive and provides an easily understandable monitoring means.

In a case devoid of faults, this curve of the indicator varies slightly around the unit circle, unlike the faulty case where the curve is deformed significantly outside the unit circle.

Such an indicator has the advantage of being comparable with other systems regardless of the acquisition conditions (for example position of the sensors). This is very beneficial when there are several engines to analyze.

Figure 3:
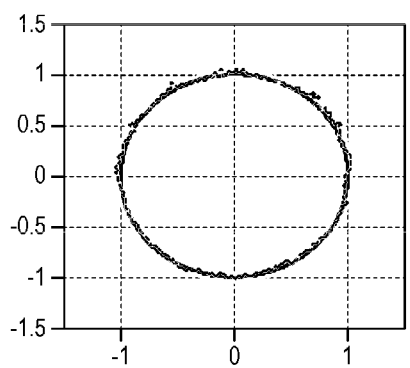
FIG. 3 illustrates a display of monitoring indicators obtained during a monitoring method according to the invention.
Figure 3:
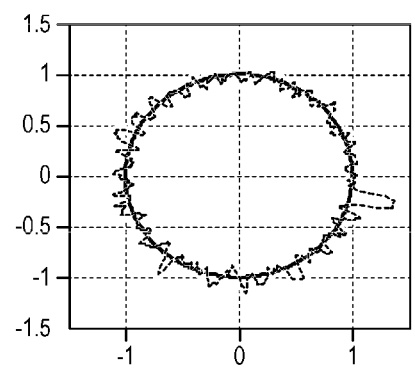
Figure 3:
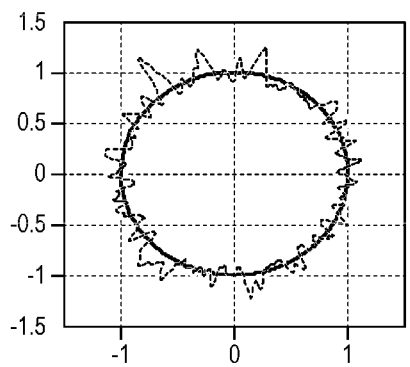
Figure 3:
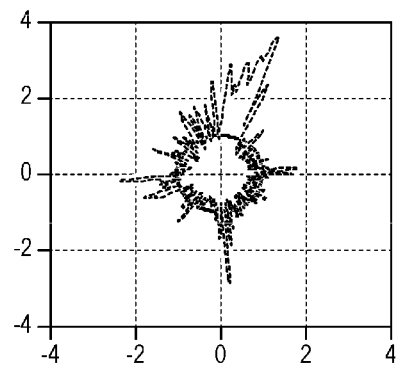

FIG. 3 illustrates the proposed indicator applied to a wheel of a reducer in four different cases, one of which comprises a flaking fault (lower right curve). The top left curve indicates a perfect wheel, while the remaining curves (top right and lower left) indicate minor geometric errors although they are completely healthy.

The invention claimed is:

1. A method for monitoring a gear system (1), the gear system (1) comprising at least two wheels, each wheel being configured to rotate at a rotational frequency, the method comprising the steps of measuring and acquiring by means of an acquisition measuring unit comprising a sensor a vibratory or acoustic digital signal noted x(t) containing a representation of the vibrations of the gear system; the sensor being an accelerometer or a microphone;

the method comprising, for each rotational frequency of each wheel, the steps of:

filtering, by means of a filter, the vibratory or acoustic digital signal for obtaining an image monitoring signal containing at least vibratory component of at least one fault;

computing the square envelope of the image monitoring signal, defined by the squared absolute value of the Hilbert transform of the image monitoring signal to extract an image of the modulating signals associated with the rotation of the wheels from the image monitoring signal;

computing the synchronous average of the square envelope with respect to a period of rotation of a wheel of interest chosen among the wheels of the gear, the synchronous average of the square envelope attenuating spurious components in the envelope coming from other mechanical sources;

computing the square root of the synchronous average normalized by the median value of the synchronous average for obtaining a monitoring indicator as a function of the synchronous average;

comparing the variation of the monitoring indicator to a reference for detecting at least one fault.

2. The monitoring method according to claim 1, comprising a step of displaying (E6), in polar coordinates of the monitoring indicator, the monitoring indicator signaling at least one fault when it varies around a unit circle.

3. The monitoring method according to claim 1, comprising a step of obtaining (E106) a filter from a selective spectral kurtosis defined by the part of the spectral kurtosis of the digital signal related to said characteristic frequency.

4. The monitoring method according to claim 3, wherein the determination of the selective spectral kurtosis of the digital signal comprises the following sub-steps:

determining (E101) a short-term Fourier transform of the digital signal defined by $$X(i\Delta t; m\Delta f) DFT_{n\delta_r \to m\Delta f}^{Nh}\{h(n\delta_r - i\Delta t)x(n\delta_r)\} \; 0 \leq m < S$$

with $\Delta t/\delta_r = N_h(1-\rho)$ where $\rho$ refers to the rate of overlap of the sliding window and $S=T/\Delta t$ is the digital length of the short-term Fourier transform with respect to the variable $i\Delta t$ and T is the duration of acquisition of the signal;

normalizing (E102), for each frequency $m\Delta f$, the short-term Fourier transform obtained as follows:

$$X_N(i\Delta t; m\Delta f) = \frac{X(i\Delta t; m\Delta f)}{\sigma_x(m\Delta f)},$$

where $\sigma_x(m\Delta f) = \sqrt{\frac{1}{S}\sum_{n=0}^{S-1}|X(i\Delta t, m\Delta f)|^2}$ is the standard deviation of the short-term Fourier transform with respect to the time variable at the frequency $m\Delta f$;

determining (E103), for each frequency $m\Delta f$, the discrete Fourier transform with respect to a time axis $$\Gamma_{2X}(a \cdot \Delta\alpha; m\Delta f) = \frac{1}{S} DFT_{i\Delta t \to a\Delta\alpha}^{S}\{|X_N(i\Delta t; m\Delta f)|^2\},$$

where $$\Delta\alpha = \frac{1}{\Delta t \cdot S}$$

is the frequency resolution with respect to the secondary frequency $a\Delta\alpha$;

determining (E104) the selective spectral kurtosis by means of the following functional:

$$KSS_{4X}^{f1}(m\Delta f) = \sum_{a=c \cdot k} |\Gamma_{2X}(a\Delta\alpha; m\Delta f)|^2.$$

with c=1, 2, 3 ... and such that c<S/2k−1.

5. The monitoring method according to claim 3, wherein the step of obtaining (E106) the filter is defined by the square root of the selective spectral kurtosis as follows:

$$H_{f_l}(m\Delta f) = \sqrt{KSS_X^{f_l}(m\Delta f)}$$

with $f_l$ the considered characteristic frequency.

6. The monitoring method according to claim 1, comprising a step of obtaining a filter from the spectral kurtosis or from the kurtogram of the digital signal.

7. The monitoring method according to claim 1, wherein the step (E0) of measuring and acquiring the vibratory or acoustic digital signal x(t), is implemented by an accelerometer or a microphone.

8. The monitoring method according to claim 1, comprising a step (E2) of angularly re-sampling the vibratory or acoustic digital signal.

9. A monitoring system comprising a processing unit configured to implement a method according to claim 1, the said monitoring system comprising a unit (1) for measuring and acquiring a vibratory digital signal x(t), the acquisition measuring unit (1) comprising a sensor (21).

10. A monitoring system according to claim 9, wherein the sensor is an accelerometer or a microphone.

11. A non-transitory computer readable medium comprising code instructions for executing the steps of the method according to claim 1, when the code instructions are executed by at least one processor.

\* \* \* \* \*